United States Patent [19]

Mattson et al.

[11] Patent Number: 5,551,003
[45] Date of Patent: Aug. 27, 1996

[54] SYSTEM FOR MANAGING LOG STRUCTURED ARRAY (LSA) OF DASDS BY MANAGING SEGMENT SPACE AVAILABILITY AND RECLAIMING REGIONS OF SEGMENTS USING GARBAGE COLLECTION PROCEDURE

[75] Inventors: Richard L. Mattson, Pacific Grove; Jaishankar M. Menon, San Jose, both of Calif.

[73] Assignee: International Business Machines Corporation, Armonk, N.Y.

[21] Appl. No.: 196,047

[22] Filed: Feb. 14, 1994

Related U.S. Application Data

[63] Continuation-in-part of Ser. No. 989,245, Dec. 11, 1992, Pat. No. 5,416,915.

[51] Int. Cl.$^6$ ............................................. G06F 13/24
[52] U.S. Cl. ................. 395/463; 395/439; 364/245.2; 364/246.12; 364/246.5; 364/DIG. 1
[58] Field of Search ................................. 395/439, 441, 395/440, 404, 463, 250, 500, 600, 700

[56] References Cited

U.S. PATENT DOCUMENTS

| | | | |
|---|---|---|---|
| 4,914,656 | 4/1990 | Dunphy, Jr. et al. | 371/10.2 |
| 4,916,605 | 4/1990 | Beardsley et al. | 395/489 |
| 4,987,533 | 1/1991 | Clark et al. | 395/600 |
| 5,150,472 | 9/1992 | Blank et al. | 395/464 |
| 5,157,770 | 10/1992 | Beardsley et al. | 395/439 |
| 5,235,692 | 8/1993 | Ayres et al. | 395/849 |
| 5,247,638 | 9/1993 | O'Brien et al. | 395/888 |
| 5,247,647 | 9/1993 | Brown et al. | 395/180 |
| 5,261,088 | 11/1993 | Baired et al. | 395/600 |
| 5,263,145 | 11/1993 | Brady et al. | 395/441 |
| 5,325,523 | 6/1994 | Beglin et al. | 395/600 |
| 5,379,385 | 1/1995 | Shomler | 395/421.01 |
| 5,394,532 | 2/1995 | Belsan | 395/441 |
| 5,442,752 | 8/1995 | Styczinski | 395/404 |
| 5,457,793 | 10/1995 | Elko et al. | 395/600 |

OTHER PUBLICATIONS

"Storing and Moving the Data Source", by McCormick Paula, Mar. 1988, Software Magazine, V8, N3, P48(8).
Patterson et al., "A Case for Redundant Arrays of Inexpensive Disks (RAID)", Report No. UCB/CSD 87/391, Dec. 1987, Computer Science Division (EECS), University of California, Berkeley.
Base Technologies, "Winged Memory" Unix Review, vol. 7 No. 9 pp. 59–66 by Randy H. Katz.
"The Design and Implementation of a Log–Structured File System" by Mendel Rosenblum and John K. Ousterhout.

Primary Examiner—Thomas C. Lee
Assistant Examiner—Moustafa Mohamed Meky
Attorney, Agent, or Firm—Baker, Maxham, Jester & Meador

[57] ABSTRACT

Seek affinity is preserved in a segment oriented, cached, log structured array (LSA) of DASDs responsive to accesses dominated by sequential read and random writes of logical tracks stored in the segments. This is achieved by collecting all the write modified read active tracks and clean read active tracks either destaged from the cache or garbage collected from the LSA and rewriting them out to the LSA as segments into regions of contiguous segments of read active tracks. Also, all write modified read inactive tracks and clean read inactive tracks either destaged from cache or garbage collected from the LSA are collected and rewritten out to the LSA as segments into regions of contiguous segments of read inactive tracks. Garbage collection is initiated when the detected free space in a region falls below a threshold and continues until the collected segments exceed a second threshold. Alternatively, write age of logical tracks may be used instead of read activity so as to cluster LSA DASDs into a region of segments formed from old write active logical tracks and a region of current write active logical tracks.

28 Claims, 5 Drawing Sheets

CACHE ORIENTED BUFFERED DASD ARRAY

CACHE ORIENTED BUFFERED DASD ARRAY

RELATIONS BETWEEN LOGICAL AND REAL DASD ARRAY STORAGE

CACHE TO ACCUMULATING BUFFER DESTAGE AND GARBAGE COLLECTION

FLOW OF CONTROL IN A LOG STRUCTURED ARRAY OF DASDS WHEREIN SEEK AFFINITY IS MAINTAINED

GARBAGE COLLECTION AND FILE REWRITING IN
AN LSF SYSTEM ACCORDING TO THE PRIOR ART

SYSTEM FOR MANAGING LOG STRUCTURED ARRAY (LSA) OF DASDS BY MANAGING SEGMENT SPACE AVAILABILITY AND RECLAIMING REGIONS OF SEGMENTS USING GARBAGE COLLECTION PROCEDURE

OTHER RELATED APPLICATIONS

This application is a continuation in part of the application of Mattson et. al., U.S. Ser. No. 07/989,245, "DASD Array With Seek Affinity and Write Sensitive File System", filed Dec. 11, 1992, now U.S. Pat. No. 5,416,915.

FIELD OF THE INVENTION

This invention relates to moving magnetic information storage, and more particularly, to methods and means for accessing information on log structured arrays (LSA) of direct access storage devices (DASD's).

DESCRIPTION OF RELATED ART

In the prior art, increased processor speeds have increased I/O demands on external storage. The engineering response assumed that for random read operations, repeated references to backing storage could be reduced by staging data to a large intermediate cache. Also, it was assumed that the write update path could be improved by buffering the updates and asynchronously batch recording them on DASD. This is taught in Beardsley et al, U.S. Pat. No. 4,916,605, "Fast Write Operations", issued Apr. 10, 1990.

It was also discovered that the write path to external storage could be optimized if it was managed as if it were a semi-infinite tape whose fragmented storage extent was periodically garbage collected and overwritten at the end of the log file in compressed form while preserving various affinities. Such a file management is termed a "log structured file".

It was further discovered that if an array of N DASDs were synchronously accessed and data striped thereacross, then the data rate increased N*DASD rate and the logical track became N times the size of the DASD physical track etc. Relatedly, a DASD array managed as a log structure file is called a "log structured array" (LSA). Relatedly, an LSA is illustrated in O'Brien et. al., U.S. Pat. No. 5,247,638, "Apparatus For Compressing Data In A Dynamically Mapped Virtual Data Storage Subsystem", issued Sep. 21, 1990.

Arrays of DASDs

A DASD array comprises an array of failure independent DASDs and a buffered cache control unit. The control unit regulates traffic between an accessing processor and the cached DASD array.

DASD arrays are described in Patterson et. al., "A Case For Redundant Arrays Of Inexpensive Disks (RAID)", Report No. UCB/CSD 87/391, December 1987, Computer Science Division, University of California, Berkeley. He categorizes them into five types. These types represent a tradeoff among the number of processes concurrently accessing the array, the data rate, and the number of DASDs devoted to either redundant storage or sparing.

For instance, if data were ordinarily written to N DASDs, then a RAID 1 array mirroring all DASD updates would require 2N DASDs. Any DASD failure would be transparent to the process because the mirrored copy would be instantly available for accessing.

For high data rate and recoverability using P<N redundant DASDs, a RAID 3 array may be formed in which N+P DASDs can be synchronously accessed. In the RAID 3 context, a maximum of P concurrent failures can be tolerated although the array would have to be operated in degraded or reduced performance mode. Any unavailable data could be recalculated from the remaining redundant and data DASDs.

Reference should be made to Dunphy et. al., U.S. Pat. No. 4,914,656, issued in April, 1990. Dunphy disclosed that a "hot spare" DASD, when substituted for a failed DASD and rewritten, would restore a RAID 3 array from degraded mode to fault tolerant mode. Otherwise, references to unavailable data would have to be recomputed each time.

The tradeoff between data rate and concurrent access by two or more processes of different subsets of array DASDs typifying a RAID 5 array is described in Brady et. al. U.S. Pat. No. 5,263,145, "Method and Means for Accessing DASD Arrays with Tuned Data Transfer Rate and Concurrency", issued Nov. 16, 1993.

Caching

It has also been found that if a very large least recently used (LRU) managed cache is interposed between a processor and a DASD array, then a significant fraction of the read requests can be satisfied without referencing DASD storage. Unfortunately, the large read caches do not alter write update accesses. Write updates must be written to DASD on some timely basis in order to maintain data availability and integrity.

As Katz points out in UNIX Review, copyright by Miller Freeman, September 1989, SECTION: Vol. 7; No. 9; Pg. 58, one consequence of the use of a large read cache and the need to write updates to DASD is that accesses of the DASD array consist mostly of writes. The throughput suffers on writes because of the overhead involved in updating parity information.

As both Patterson and Katz note, a write penalty is incurred because each write update requires four distinct array access operations. These are, namely, read old data, read old parity, write new data, and write new parity. Parenthetically, new parity logically combines the old and new data and the new parity. This means that the critical path to improved cache oriented external storage subsystem performance is dominated by write performance.

The Log Structured File to the Rescue

Rosenblum and Ousterhout "Design and Implementation of A Log Structured File System", SOSP-91, Monterey 1991 describe the UC Berkeley SPRITE log structured file (LSF). An LSF is a host organization of UNIX storage in which write efficiency and recovery is maximized by modeling storage as a shadow written near infinite tape with sufficient directories to minimize sequential scans to locate data. In an LSF, all live and updated files are rewritten at the end of the log after garbage collection. This is termed copying and compacting.

The log structured file organization increases efficiency of writing modified data. However, the penalties incurred include (1) losing SEEK affinity; (2) having to maintain a directory structure which keeps track of the dynamically changing physical location of logical blocks of information and; (3) having to periodically garbage collect together blocks that have not been modified and move them to new locations. The latter is necessitated in order to leave contiguous clean space for writing the large units of modified blocks from the log.

Rosenblum at pp.4–5 points out that the process of copying live data out of a segment is called segment cleaning. In Sprite LSF, it is a three step process: read a number of segments into memory, identify the live data, and write the live data back to a smaller number of clean segments. After this operation, the segments that were read are marked as clean and they can be used for new data or for additional cleaning.

Use of Local Log Structured Files to Preserve Seek Affinity and Write Efficiency The copending Mattson application discloses a method for preserving SEEK affinity and WRITE efficiency in which logical cylinders, as recorded on a DASD array, are managed as individual LSF's. Tracks or segments of data and parity blocks having the same or different parity group affinity and stored on the same or different DASD cylindrical addresses are written into a directory managed buffer. Blocks having the same parity affinity and written to counterpart cylinders are written out from the buffer to spare space reserved as part of each DASD cylinder. Otherwise, blocks are updated in place in their DASD array location.

In the parent Mattson application and this specification, the term "seek affinity" is defined as the ratio of the average seek time while executing any given workload divided by the average seek time in accessing a random workload. The smaller the value of seek affinity, the better the performance.

The factors influencing seek affinity are the clustering of data on the DASD and the pattern of read and write operations. If records were stored on contiguous DASD locations on the same track, then reading or writing the data would minimize seeking. If the data were randomly distributed, then seek times supporting sequential access would significantly increase.

"Write sensitivity" measures the amount of system managed storage resource needed to perform a write operation on parity coded data. For instance, an "update-in-place" of parity coded data requires four operations. These are reading of the old parity, reading of the old data, calculating the new parity, and writing out the new parity and new data.

The key concept in Mattson is that of treating each cylinder of data as an LSF permitting SEEK affinity within the cylinder to be preserved. This is advantageous where sequential scans of data in contiguous DASD locations occur.

Storage Organization of an LSA

An LSA, according to the prior art and as used in this invention, consists of groups of DASDs arranged in N+1 DASDs per group. The recording extent of each DASD in a group is divided into large consecutive areas called "segment-columns". A segment-column is typically as large as a physical cylinder on a DASD. Corresponding segment-columns from the N+1 DASDs constitute a "segment". An array group of N+1 DASDs has as many segments as there are segment-columns on any one of the DASDs in the array. One of the segment-columns of a segment contains the parity (XOR) of the remaining segment-columns of the segment.

As may be appreciated, data may be stored in fixed block or variable length format. One particular form of the later known as "Count, Key, and Data" (CKD) format is recorded on IBM 3390 type DASDs. If an array control unit includes resident microcode emulating one or more logical devices such as logical DASDs or tape drives etc., the physical nature of the external storage subsystem can be made transparent to the operating system and applications executing on an accessing processor. Thus, read and write commands sent by a processor to an external storage subsystem would be interpreted by the array control unit with the actual access being made in a manner not otherwise "known" to the processor. It is said that one or more logical devices can be "mapped" onto the actual physical devices.

Returning to consideration of the "segment" organization of an LSA, for performance reasons, the parity segment-columns are not all on the same DASD, but are rotated among the DASDs. Logical (CKD) devices are mapped and stored in this LSA. A logical (CKD) track is stored entirely within some segment-column of some DASD of the array. Furthermore, many logical tracks can be stored in the same segment-column. Since the location of a logical track in an LSA changes over time, a directory, called the LSA directory, is used to indicate the current location of each logical track. It has an entry for each logical track.

Each LSA directory entry for a logical track includes the logical track number, the DASD and segment-column # within the DASD, the starting sector within the column at which the logical track starts, and the length of the logical track in sectors. Given a request to read a logical track, the controller examines the LSA directory to determine the DASD, starting sector # and length in sectors to which the logical track is currently mapped, then reads the relevant sectors from the relevant DASD.

Writes to the array are first accumulated in a buffer and then written in a batch to the array. This buffer, termed a memory segment buffer, can accommodate N+1 segment-columns to form a "segment". Each segment comprises N data segment-columns and 1 parity segment-column. When a track is updated by the system, it is written into one of the N data memory segment-columns in the buffer.

At the point in time when the memory segment buffer is full and cannot hold any new tracks from the system, a parity segment-column is generated by performing an exclusive OR operation (XORing) over all of the N data segment-columns in the segment. Next, the N+1 segment-columns are written to an empty segment on the DASD array. Also, all logical tracks that were just written to DASD from the memory segment buffer must have their entries in the LSA directory updated to reflect their new DASD locations.

Garbage Collection in an LSA

It should be appreciated that gaps in contiguous recording areas or "holes" form in segments on DASDs that previously contained one or more of the logical tracks. This devolves in part from the fact that some logical tracks or portions thereof are deleted or variously amended. In order to assure that an empty segment is always available on the DASD array for batch recording, the array control unit "garbage collects" segments from the array. This means rewriting the logical tracks from segment columns elsewhere such as at the end of a "logical file of segments". Parenthetically, this is shown in FIG. 5.

To be sure, the array control unit includes a multi-tasking processor of its own with significant local memory. This permits garbage collection to be executed as one of the control unit's background processes.

In "garbage collection", the control unit selects a subset of DASD array segments that either exhibit a significant fraction of "holes" or are not believed subject to the creation of "holes" in the near future. In this regard, all logical tracks from a segment selected for garbage collection that are still in that segment (have not been moved) are read from DASD and placed in the memory segment buffer. These logical tracks will be written back to DASD when the memory segment buffer fills along with other logical tracks received from the host system. The space (segments) on the DASDs that has now been freed are returned to the empty segment pool and are available when needed (again see FIG. 5).

SUMMARY OF THE INVENTION

It is an object of this invention to devise a method and means for managing a log structured DASD array in order to preserve seek affinity on any external processor initiated read and write access patterns.

It is a related object to preserve such seek affinity where the access patterns are dominated by sequential reads and random writes.

It is yet another object to devise a method and means that concurrently optimizes seek affinity while flattening the device skew.

As part of this invention, it was unexpectedly observed that the objects could be satisfied if:

(1) all data (records) in a neighborhood (a cylinder) was collected and sequentially recorded on one DASD;
(2) all data collected from read active neighborhoods was recorded in close proximity to each other; and
(3) recently modified data was separated from older data that has been garbage collected.

These precepts are embodied in a method and means for accessing an LSA and preserving seek affinity on workloads with random write content. The LSA includes an array control unit responding to I/O requests for logical tracks either by referencing a large non-volatile read and write cache or a DASD array as a backing store. It further includes an accumulating buffer write path means for batch writing from the cache to the array and for garbage collecting from the array and rewriting thereto. Relatedly, the method of this invention comprises the reiterative steps of:

(a) accumulating neighborhoods of tracks in a buffer in a destage path from the caching means and in a garbage collection path from the LSA, and read activity sorting the accumulated neighborhoods of tracks into corresponding segments formed from write modified read active logical tracks, write modified read inactive logical tracks, clean read active logical tracks, and clean inactive logical tracks;
(b) writing segments from the buffers formed from write modified or clean read active tracks into an LSA region of contiguous segments of read active tracks and writing segments from the buffer formed from write modified or clean read inactive tracks into an LSA region of contiguous segments of read inactive tracks; and
(c) detecting the number of free space segments in each region and garbage collecting segments having either free space, old write age, or read inactive tracks in the regions on the LSA as a function of a first threshold, continuing the collection until the number of collected segments exceeds a second threshold, and applying the collected segments to the garbage collection path.

In step (a), "read activity" is a count of the number of read accesses made to a logical track on DASD other than those made to a read or write cache. In addition to maintaining a read activity per logical track, the method also maintains "read activity per segment". Relatedly, the read activity per segment is sum of read activity over all logical tracks in a segment divided by the number of logical tracks in the segment.

Also in this invention, the term "logically adjacent tracks" are tracks which both reside in the same "neighborhood". For this purpose, a "neighborhood" is defined an ordered set of logical tracks.

Rather than merely writing over a designated portion of read cache, the method actually destages those LRU logically adjacent clean tracks which are not stored in physically contiguous locations on DASD.

The method places the accumulated neighborhoods into respective ones of four buffers in which all the tracks in any one of the buffers have the same attribute. These are a buffer clustering dirty logical tracks of high read activity, a buffer of dirty logical tracks of low read activity, a buffer of either clean logical tracks or garbage collected tracks of high read activity, and a buffer of either clean or garbage collected tracks of low read activity. Parenthetically, a "dirty" track is a write modified logical track while a "clean" track is an unchanged logical track. Ultimately, this invention maps the four buffers (termed memory segment buffers) into two DASD regions in the LSA, namely, a DASD region of segments formed from clean logical tracks and a DASD region of segments formed from dirty logical tracks.

In step (c), alternative DASD disk layouts include one selected from the set consisting of (1) regions of read active logical tracks occupy middle DASD cylinders while regions of read inactive logical tracks occupy the extreme cylinders, or (2) lower ranges and upper ranges respectively.

The method and means of this invention can be modified so as to partition an LSA into a region of segments formed from write active logical tracks and a region of segments formed from write inactive logical tracks. This operates as an alternative to partitioning an LSA into a region of read active segments and read inactive segments. That is, the write age of logical tracks is used as the clustering or sorting criterion instead of read activity.

DESCRIPTION OF THE PREFERRED EMBODIMENT

Figure 1:
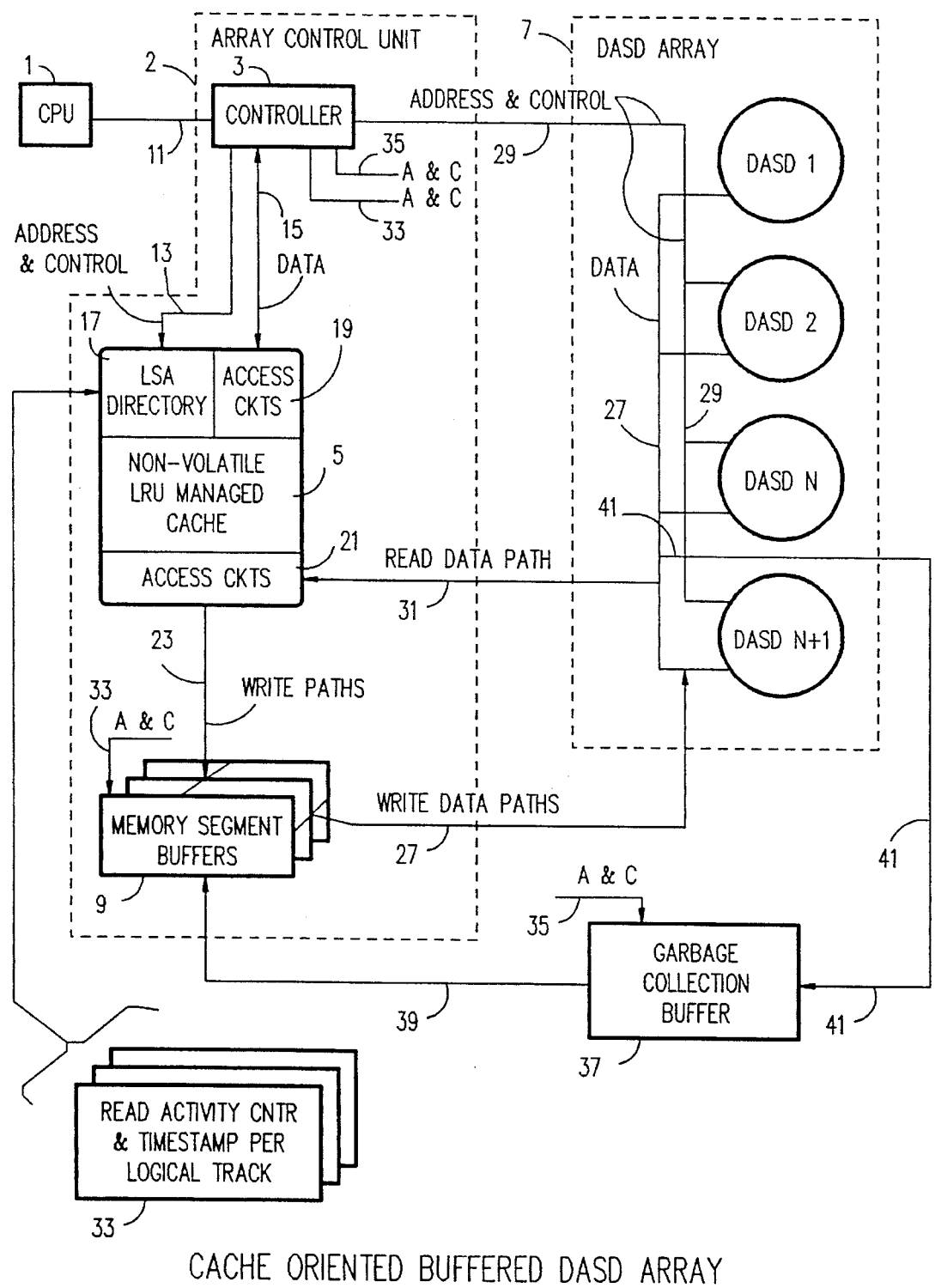
FIG. 1 depicts an LSA of DASDs having a control unit including a LRU managed non-volatile cache, a memory segment buffer, and a garbage collection segment rewrite path according to the invention.
Figure 2:
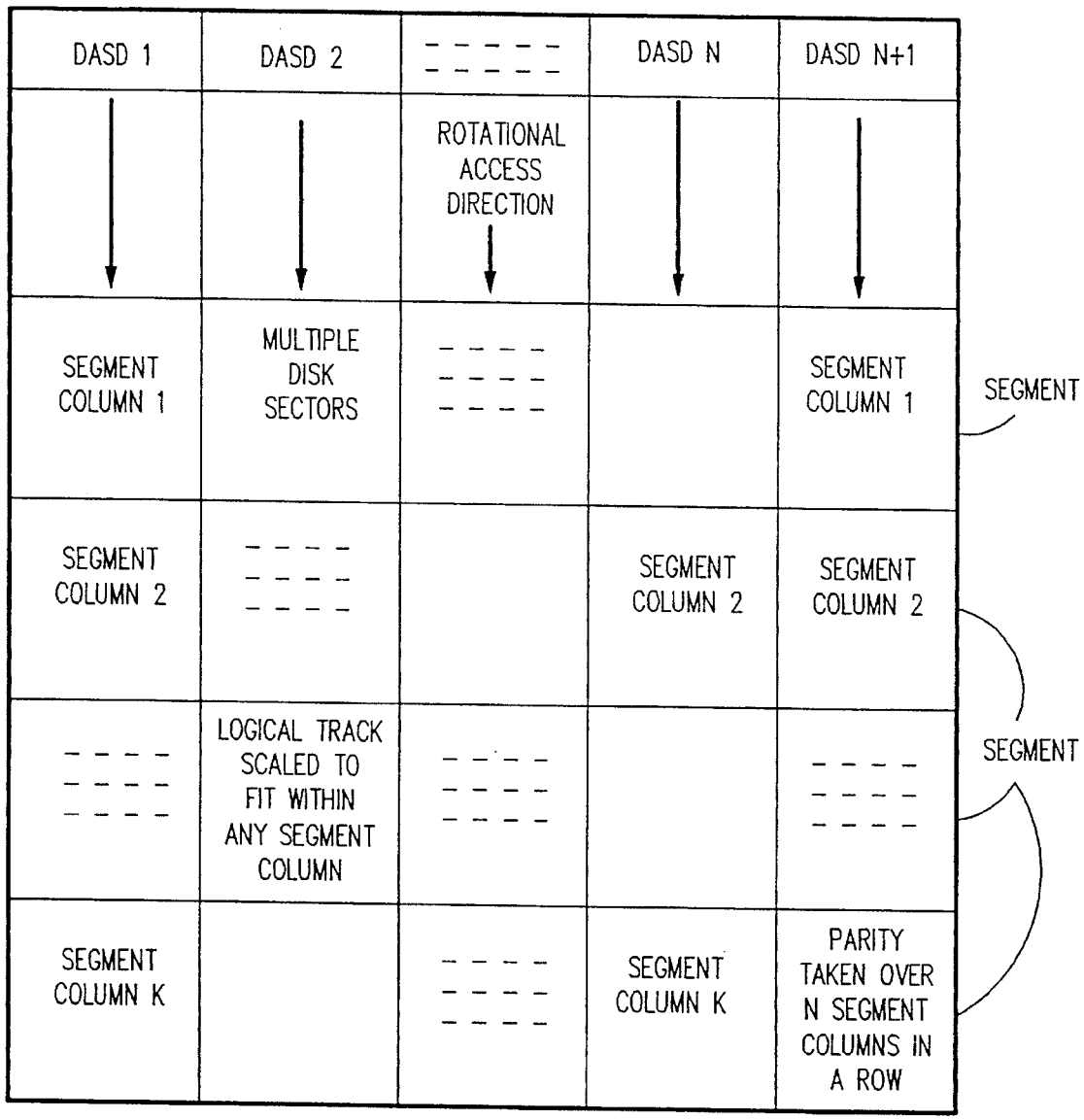
FIG. 2 shows the relationship among column segments, memory segments, and logical tracks over the array.
Figure 2:
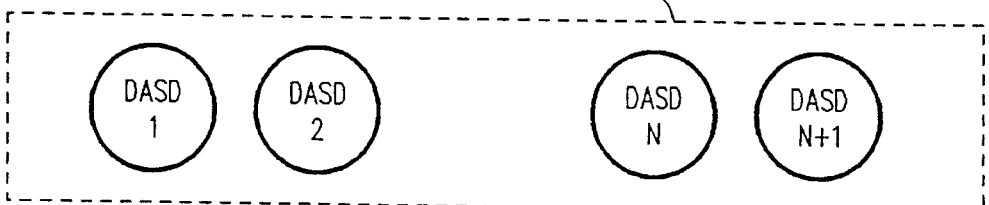

Referring now to FIG. 1, there is shown a system including a host processor 1, and an external store. The latter is formed from an array 7 of groups of N+1 DASDs, and an array control unit 2 coupling the processor to the array. Processor 1 preferably comprises at least one or more processors used to execute application and system code;

memory to hold application code, system code, and data; and a means responsive to read and write calls from executing applications for accessing information through the system code (otherwise termed operating system such as MVS, AIX, CICS etc.) not otherwise in memory from the external store.

Typically, as described in Luiz et al, U.S. Pat. No. 4,207,609, "Method and Means for Path Independent Device Reservation and Reconnection in a Multi-CPU and Shared Device Access System", issued Jun. 10, 1980, and the references cited therein, there is shown an architecture for establishing an access path to data by which a processor host or CPU obtains variable or fixed length records from an attached DASD storage subsystem.

Under this architecture, the CPU creates a dedicated virtual processor for accessing and transferring data streams over demand/response interfaces to attached subsystems using chains of special purpose I/O instructions termed "channel command words" or CCWs. The CCWs are stored in a portion of CPU main memory in support of fast calls. When an application program executes a read or write requiring access to external storage (usually attached DASD storage), then the CPU S/370 MVS operating system initiates such a reference with a START I/O command. This command causes the CPU to suspend its multi-processing state, transfer to the CCW chain, and re-establish its prior state after CCW chain completion.

Referring again to FIG. 1, processor 1 sends an appropriate CCW chain to controller 3 over path 11. Controller 3 "interprets" each of the CCW's and responsively applies counterpart control and address signals over path 13 to the LSA directory 17 to ascertain location of data either in the LRU managed cache 5 or on DASD array 7. Data is transferred between host processor 1 and array 7 in the read direction over a path including read data path 31, access circuits 21, cache 5, access circuits 19, path 15 and controller 3. Data is transferred in the write direction over a path including controller 3, access circuits 19, cache 5, access circuits 21, accumulating memory segment buffer 9 and write path 27.

Controller 3 comprises one or more microprocessors with sufficient associated local memory for storing software for interpreting the CCWs and managing the cache 5 and the DASD array 7 according to the LSF/LSA storage model of this invention.

DASD array 7 may be managed by controller 3 as a RAID 3 or a RAID 5 array as defined by the aforementioned Patterson reference. In a RAID 3 embodiment for DASD array 7, the data string segmentation or striping, parity assignment to the blocks of a group, synchronous accessing of a parity group or block from counterpart DASDs and the array operation in both fault tolerant and degraded modes is set out in Dunphy et al, U.S. Pat. No. 4,914,656, "Disk Drive Memory", issued Apr. 3, 1990.

Array control unit 2 includes a large, non-volatile (NV) cache memory 5 and memory segment buffers 9 formed from a plurality of segment sized buffers. The NV cache 5 holds both updated logical tracks received from the host CPU 1 and clean logical tracks read from DASD array 7. Cache 5 is managed in the traditional LRU fashion. That is, cache 5 contains clean tracks organized in one LRU list and modified (dirty) tracks organized in another LRU list. The fraction of cache occupied by modified tracks is monitored by the controller 3. When this fraction exceeds some threshold, some number of modified tracks are moved (logically) to one of the memory segment buffers 9. After a segments worth of tracks are stored in buffer 9, they maybe written into contiguous locations in the DASD array 7. When cache memory is needed to hold new logical tracks read from DASD, or new logical tracks received from the host system, LRU clean tracks can be overwritten in cache 5.

The buffering aspect of cache 5 permits delay in writing modified logical tracks to one of the memory segment buffers 9 and then to the DASD array 7. This delay can be advantageously employed to minimize any loss of seek affinity. If other writes to adjacent tracks are received into the cache from the system (controller 3) before the first track is selected for pushing out from cache 5 to one of the memory segment buffers 9, then all logically adjacent modified tracks can be pushed out at the same time into the same memory segment-column of the memory segment buffer. This will ensure that if adjacent tracks are modified within some window of time proportional to the size of cache 5, they will still be placed contiguously on DASD, and no seek affinity will be lost.

The cache 5 is operated according to the following constraints:

(1) When the fraction of cache space occupied by modified tracks exceeds a threshold, and a modified LRU track is pushed from the cache 5 to one of the memory segment buffers 9, then the memory segment buffers 9, preferably the same memory segment-column. That is, if there are at least c (e.g. c=2) adjacent clean tracks in cache at this time, then the adjacent clean tracks should likewise be pushed out to one of the memory segment buffers 9 as well.

(2) Shortly before the space containing an LRU clean track is scheduled for reuse, ascertain whether at least m (e.g. m=1) logically adjacent clean tracks are in cache 5 and are not currently stored physically contiguously on DASD disk. If such tracks are found, push the LRU clean track and all adjacent clean and modified tracks to one of the memory segment buffers 9, preferably in the same memory segment-column.

As may be recalled, the term "logically adjacent tracks" are tracks which both reside in the same "neighborhood". For this purpose, a "neighborhood" is defined as an ordered set of logical tracks. It follows that "adjacent neighborhoods" are those in which the first k logical tracks are in neighborhood 1, the second k tracks are in neighborhood 2, and so on. Then, a track is logically adjacent to another if they are both in the same neighborhood. Thus, a neighborhood consisting of k=15 logical tracks can form a logical cylinder on a typical logical DASD storage device.

Improving SEEK Affinity

In order to improve seek affinity, a read activity counter 33 is maintained for each logical track. The counter contents are preferably stored in the LSA directory 17 entry for the counterpart logical track. In this regard, the read activity of a logical track is an indicator of how much read activity a track has seen. The higher this number, the more read activity there has been against a logical track. The counter contents are ONLY affected by read activity to the logical track on DASD disk. It is not affected by read accesses to the logical track that are satisfied in the cache 5. Also, recent read activity is weighted higher than read activity occurring in the distant past.

An average read activity per segment is maintained in addition to maintaining a read activity per logical track. The average activity per segment is defined as the sum of the read activities of all logical tracks in a segment divided by the number of logical tracks in the segment. Recall that a segment comprises N segment columns+a parity segment column.

The DASDs of the subsystem are partitioned into groups of N+1 DASDs per group. For a given group of N+1 DASDs such as those depicted in array 7, segments are divided into those meant to receive read active data and those meant to receive read inactive data. The former type of segments are said to be Region 1 segments and the latter type of segments are said to be Region 2 segments. For example, 20% of the segments may be earmarked as Region 1 segments and 80% may be earmarked as Region 2 segments. Region 1 segments are all contiguous to each other and separated from Region 2 segments which are contiguous to each other. At this point, consideration is given to the notion of "hot dataset".

Seek Affinity and Hot Datasets

Many current DASD storage subsystems that are not organized as log-structured arrays tend to see reasonably good seek affinity, even on workloads that have mostly random content—such as database workloads. This is because over short time interval some dataset tends to get most of the activity on any DASD. Even if accesses to the dataset are random, the DASD arm only needs to move within the cylinders that contain the dataset. Such a dataset is termed a "hot dataset". At any one time, only one "hot dataset" is accessed by a DASD arm. This derives from the characteristic of some applications to carefully separate datasets and place them on DASDs in such a way that multiple datasets on a DASD are not simultaneously "hot".

In contrast, in a log-structured array, datasets tend to be stored on multiple DASDs. However, if multiple datasets are hot in the subsystem, and where each DASD in an array has pieces of each of the hot datasets, the each DASD arm is likely to move between the hot datasets, than causing a loss of seek affinity.

The goal is to make logical tracks from hot datasets end up in Region 1 segments so they can be found in a narrow band of cylinders on the DASDs. Of course, there will be times when inactive data can be found in Region 1 segments, and active data in Region 2 segments. In such cases of mixed active and inactive data, it is desirable to migrate these data to their appropriate type of segment.

Seek Affinity and Laying Out Regions of the DASD Disks

The two regions on each group of N+1 DASDs may be organized in a number of ways. A first layout allows Region 1 segments to occupy the middle cylinders of the DASDs, and the Region 2 segments to occupy the extremity cylinders of the DASDs. A second layout permits Region 1 cylinders to occupy the lower range of cylinders and the Region 2 cylinders to occupy the upper range of cylinders.

Write Age

Logical tracks may also be separated based on their write age. The longer it has been since they were written by the system, the higher the "write age" of a logical track. "Write age" is an important measure for deciding whether any given logical track will be written again. If a track has been written in the near past, then there is a greater expectancy that it will be written again in the near future. In this invention, write age per segment is preferred rather than write age per logical track because of simplicity.

In this invention, the write age of a segment is defined as the smallest of the write ages of all logical tracks in the segment.

New data written by the system and destaged by cache is not mixed with data that is garbage collected and rewritten into new segments. This stems from the fact that the newly written data and the garbage collected data have different write ages. Also, it is desired to preserve the option of separating garbage collected data recently written from garbage collected data that is old.

Advantageously, separating data based on write age permits keeping data that is not likely to be written again in a separate segment. This measure ensures that the segment remains stable in that it is not likely to be fragmented (does not get many holes).

The consequence of this separation is that the holes will tend to form in the remaining segments. Over time such segments will become emptier than if the holes were allowed to form in all the segments equally. By forcing holes disproportionately into some segments over others, then when the need arises to garbage collect a segment, fragmented segments are readily available. This reduces the garbage collection overhead.

The Flow of Control of the Method and Means of the Invention

As may be recalled, the method and means for managing a log structured array of DASDs so as to optimize performance broadly comprises the steps of (1) assembling all data in a neighborhood (a cylinder) and writing them sequentially on one DASD; (2) placing data from read active neighborhoods in close proximity to each other; and (3) separating freshly written data from older data that has been garbage collected.

Figure 3:
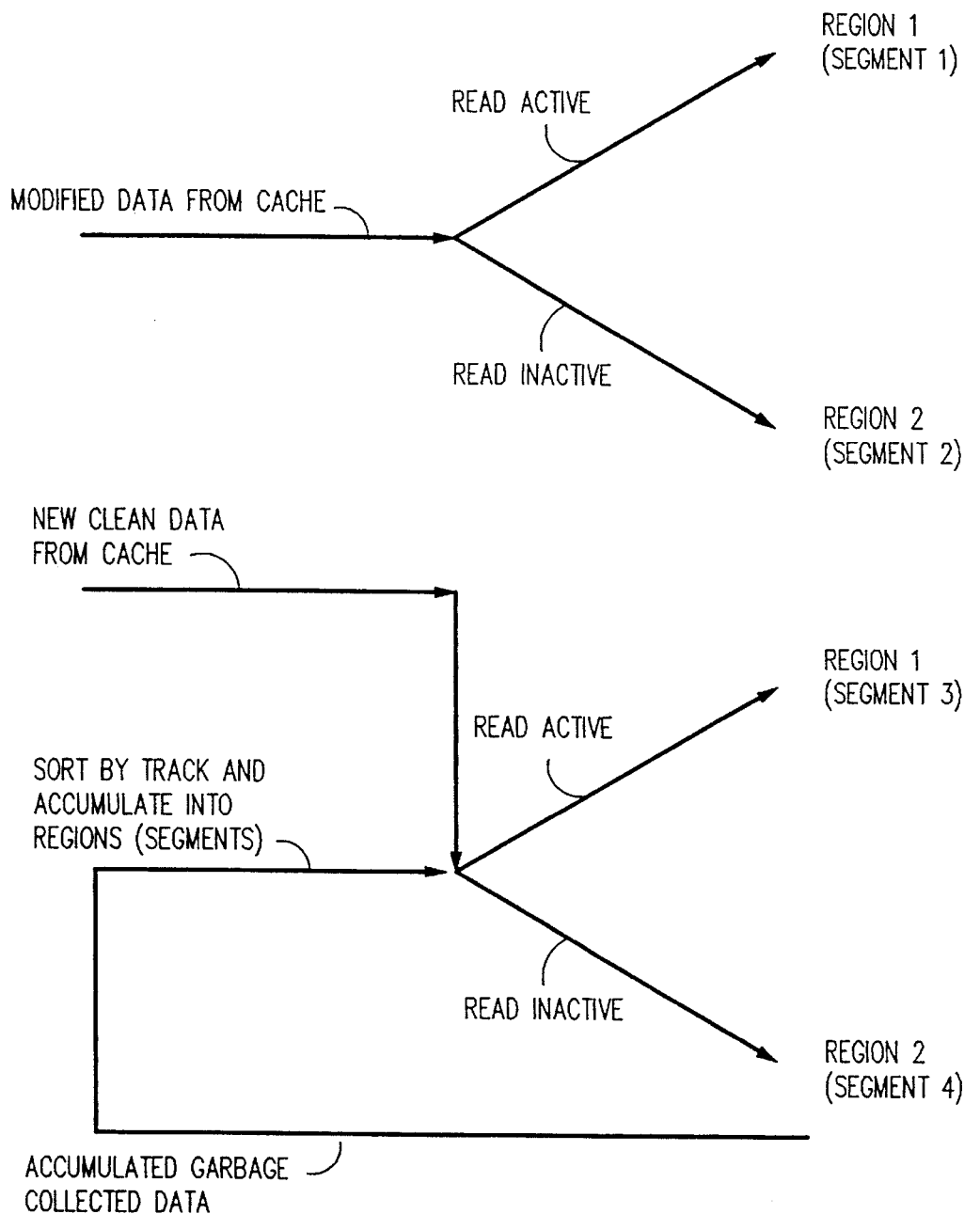
FIG. 3 sets out the destage and garbage collection process.
Figure 4:
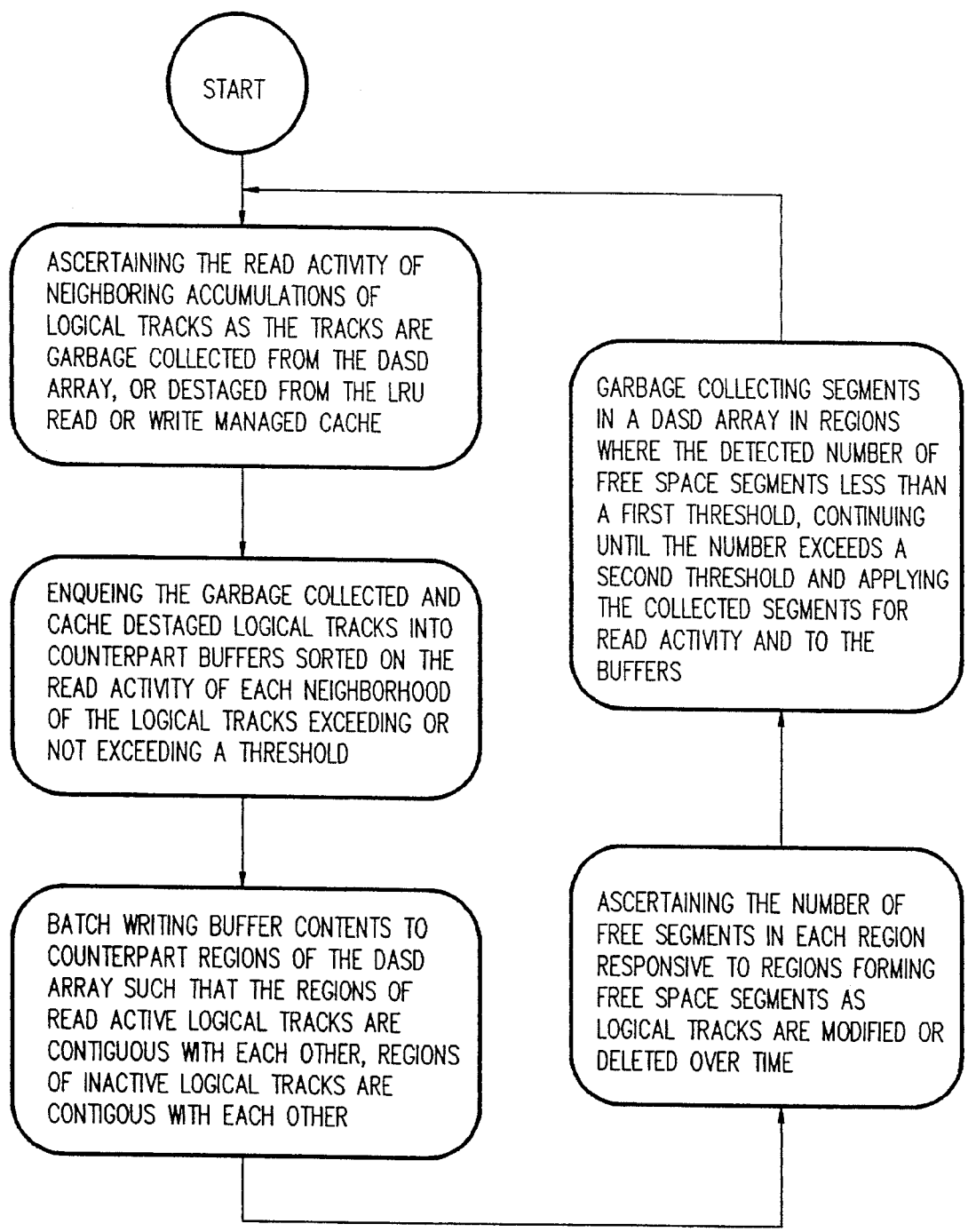
FIG. 4 is a flow diagram of the method of the invention.
Figure 5:
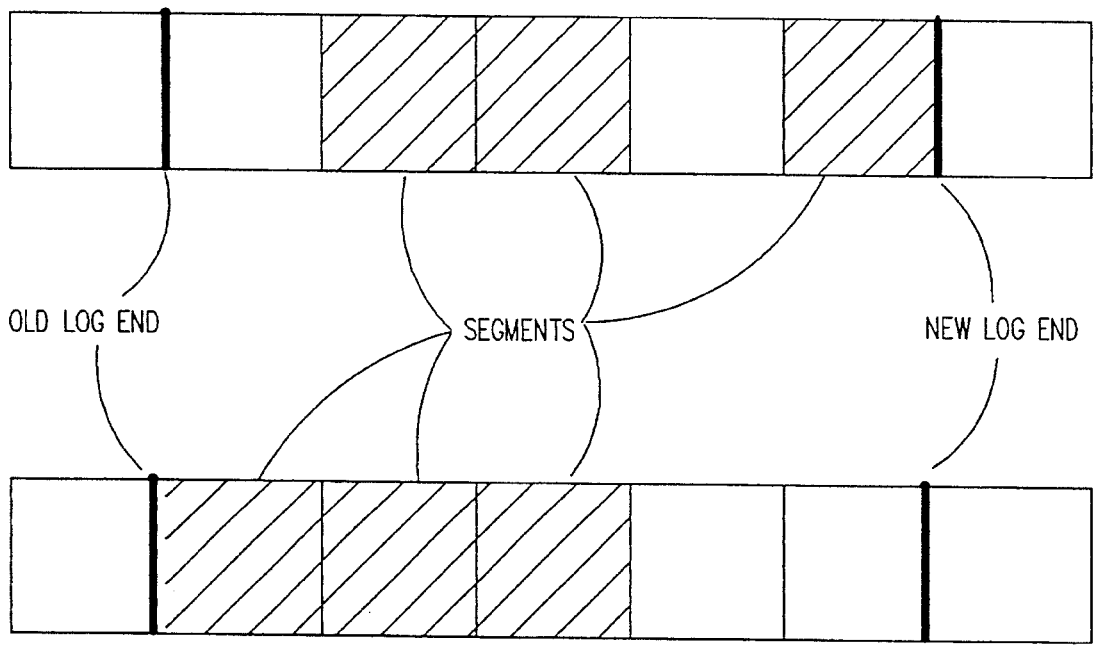
FIG. 5 illustrates one of the possible free space management solutions for a log structured file according to the prior art.

Referring now to FIGS. 1-4, there is shown the flow of control in FIG. 4 with the dynamic aspects of garbage collection in region formation in FIG. 3.

Referring now to FIG. 3, there is shown a flow of control governing the destaging of tracks from the cache, sorting them on read activity and placing them into a designated pair of the four memory segment buffers. When the cache 5 pushes out all logical tracks in a neighborhood, logic in controller 3 decides which segment to use depending on whether most of the tracks pushed out were modified or clean. If most of the logical tracks were modified, then segments 1 or 2 are used. If most of the logical tracks were clean, then segments 3 or 4 are used.

If it is assumed that most tracks in a neighborhood pushed from cache 5 were modified, then the next operation is to add or sum the read activity counters for all the tracks in the neighborhood. This sum is then divided by the number of tracks that were pushed out in the neighborhood. This computes an average activity count for the neighborhood.

If the average count exceeds a threshold, then the logical tracks of the neighborhood are placed in segment 1. Otherwise, the tracks are placed in segment 2.

To summarize, the intended partition should result in segment 1 consisting of read active modified tracks, segment 2 containing read inactive modified tracks, segment 3 having read active clean or garbage collected tracks, and segment 4 including read inactive clean or garbage collected tracks.

When a clean neighborhood is pushed from cache 5, the neighborhood will not be written to DASD if it is already stored contiguously in the same Region (1 or 2) that it would go into if it were written to DASD.

Garbage Collection and Segment Rewriting

Referring now to FIGS. 1 and 3, there are shown the logical path and flow of control in garbage collection. Garbage collected tracks are read and placed in a garbage collection buffer 37 over a path from array 7 and line 41. When the number of tracks in the buffer 37 is reasonably large, the collected tracks are sorted by track number and accumulated into neighborhoods. The average read activity count of each neighborhood is then computed. As a result, each neighborhood is placed into an appropriate one of the memory segment buffers 9 over path 39. For garbage collected tracks, this is either segment 3 for read active neighborhoods or segment 4 for read inactive neighborhoods. If possible, each neighborhood is placed entirely in a single segment column of the segment. When a segment fills buffer 9, it is written to DASD array 7 over write data path 27.

Writing the Regions to the "Least Busiest Group" of N+1 DASDs Among Other Places As previously mentioned, the DASDs are organized into groups of N+1 DASDs. First, the least busy group of N+1 DASDs is identified. In this regard, the "least busy group" of N+1 DASDs is that group whose busiest DASD (the one with the largest queue of requests against it) is less busy than the busiest DASD of all other groups of N+1 DASDs. Next, segments 1 and 3 are written to Region 1 on this group of DASDs, whereas segments 2 and 4 are written to Region 2 on the selected group of DASDs.

Garbage Collection and a Steady Supply of "Free Segments"

Garbage collection must ensure that there is always a steady supply of free segments in both Region 1 and Region 2 of each group of N+1 DASDs. This is done via thresholds. When the number of free Region 1 segments drops below a threshold t1, garbage collection is initiated. This collection continues until the number of free segments rises above some other threshold t2. Similarly, when the number of free Region 2 segments drops below a threshold t3, garbage collection is likewise initiated. It also continues until the number of free segments rises above some other threshold t4.

Garbage collection activity is typically executed at a lower priority than other activities such as reading from DASD or destaging from memory segments to DASDs. If the number of free Region 1 segments drops below t5 or the number of free Region 2 segments drops below t6, a high priority garbage collection would be instituted. These thresholds are partially ordered as follows t5<t1<t2 and t6<t3<t4. The above six thresholds may be constants, or they my be functions of the rate at which segments are being used up by the log-structured array. When segments are being used up quickly, the thresholds could be higher than if segments are being used up slowly.

Computing Read Activity

In one embodiment for computing read activity of a logical track, two pieces of information per logical track are used. These are a read activity count R and a timestamp T. T is the time at which the read activity was computed. All read activity counts are initialized to 1 when the system is started, and all the Ts are initialized at the same time. Each time a logical track is read from DASD on a read miss to cache 5, R is first decayed exponentially using T and the current time $T_0$ as $$R=R_0*e^{-\alpha(T_0-T)}$$

where $\alpha$ is a positive decay constant and $R_0$ is the current activity. Then, 1 is added to R to account for this access to the track. Finally, T becomes $T_0$. In this way, the newer the access to a track, the greater weight it carries. Whenever there exists a need to determine read activity for a logical track, it is calculated as $$R=R_0*e^{-\alpha(T_0-T)}$$

It should be clear that other methods for calculating read activity using a different decay function are well within the scope of this invention.

Selecting a Segment for Garbage Collection

Let a segment for garbage collection be chosen as a combination of its write age and the Mount of free space in it. Let u be the utilization of a segment, so 1−u is the fraction of free space in it. Segments with low u are good candidates for garbage collection, since they return a lot of empty space with a little bit of work. Old segments (segments with high write age) are also good candidates for garbage collection, since the free space in these segments is not likely to be reclaimed without garbage collection. That is, data in these segments are unlikely to be rewritten by the system.

The criteria for selecting segments for garbage collection vary depending on whether segments are chosen from Region 1 or from Region 2.

For Region 2, all segments where u is greater than 0.8 are ignored. That is, a segment will not be garbage collected unless it will yield at least 20% space, The selection of segments optimizing the benefit to cost ratio utilizes a weighted function of u $$(w_1*(1-u)+w_2*\text{write age})/(1+u)$$

where w1 and w2 are weights.

The above formula takes into account both the occupancy and age in figuring out the best segment to garbage collect.

Since the controller 3 and the LRU management of cache 5 push out clean tracks in addition to modified tracks to the memory segment buffers 9, segments with u greater than 0.8 are eliminated from consideration. This is to avoid garbage collection from becoming a path for moving data from Region 1 to Region 2.

However, in order to effectuate garbage collection in Region 1, segments that have u greater than 0.8 are NOT eliminated from that process. Even segments that are 100% full are candidates for garbage collection. For instance, if a given segment is full of read inactive tracks, then it is a candidate for movement to Region 2. Only those segments that have u greater than 0.8 and have an average read activity counter greater than some threshold are eliminated from garbage collection consideration.

Among the remaining segments, the segment having the highest benefit to cost ratio is selected. This is calculated as:

$(w_3*(1-u)+w_4*\text{write age})/(1+u)$ where w3 and w4 are weights.

A segment with u equal to 100% may be selected for garbage collection if its average read activity index is smaller than some threshold and it has a very, very large segment age.

Migration of Data between Region 1 and Region 2

Referring again to FIGS. 1–4, it should be recalled that the object of data migration on the DASD array disks is to ensure that Region 1 has most of the read active data and that Region 2 has most of the read inactive data.

Data migrates from Region 1 to Region 2 in the following three ways:

(1) The data is rewritten by the system, and since it was read inactive, the destage logic from controller 3 including cache 5 puts it into a designated segment 2 buffer in buffer 9 which then gets written into a Region 2 segment on DASD array 7 when a segment has been filled in the designated buffer in buffer 9.

(2) The segment containing the inactive data is selected for garbage collection, and because it is read inactive, it fills a designated segment 4 buffer in buffer 9 which gets written into a Region 2 segment. Even 100% full segments might be selected for garbage collection as explained above.

(3) On a read miss, the data is read into cache 5 from DASD array 7 over read path 31. Eventually, the data is pushed out by the cache 5, and since it was read inactive, the destage logic puts it into the designated segment 4 buffer in buffer 9. This eventually becomes written into a Region 2 segment of DASD array 7.

Data migrates from the inactive to the active portion in the following three ways:

(1) The data is rewritten by the system, and since it was read active, the destage logic puts it into the designated segment 1 buffer of buffer 9. This ultimately becomes written into a Region 1 segment.

(2) The segment containing the active data is selected for garbage collection, and because it is read active, it fills memory segment 3 which gets written into a Region 1 segment.

(3) On a read miss, the data is read into cache. Eventually, the data is pushed out by the cache, and since it was read active, the destage logic puts it into memory segment 3 which then gets written into a Region 1 segment.

Extensions

It should be appreciated that in the preferred embodiment, data separation is based on whether the logical track was freshly written, or, whether it was garbage collected. It is possible to further separate garbage collected data into more categories based on write age. For example, assume that there existed three categories of data—freshly destaged data, relatively young garbage collected data, old garbage collected data. In general, if C categories of data based on write age were allowed, and M classes of data based on read activity were used, then a total of M*C memory segments would be needed in the LSA.

Region 1 segments can be maintained on fast expensive DASDs and the Region 2 segments may be maintained on either slower and cheaper DASDs or on different media such as optical or tape. In such a distribution of data, automatic data migration between different levels of a storage hierarchy is made possible employing the migration modality of this invention.

Another extension takes advantage of the fact that the number of segments in a region is not necessarily fixed. That is, the number of segments in Region 1 could be increased while the number of segments in Region 2 was decreased. This might result from determining that more of the data was "read active" than had been anticipated.

Yet another extension would allow data to be separated into multiple classes based on read activity, rather than just two. For example, suppose logical tracks were classified into three classes such as "very read active", "somewhat read active", and "inactive". The data would migrate between three levels of a storage hierarchy. Generally, a storage subsystem could have M read activity classes. Such an arrangement would require 2M memory segments. In the description of the preferred embodiment, M=2. This must be supported by four memory segments. Also, with M read activity classes, we would need M regions–Region 1, Region 2, . . . , Region M.

These and other extensions of the invention may be made without departing from the spirit and scope thereof as recited in the appended claims.

We claim:

1. In a system having a segment-oriented and buffered log structured array (LSA) of DASDs, directory controlled means for establishing read and write access paths to logical tracks stored in said segments on said LSA as referenced by a source of external commands, cache means coupling the source and the LSA for separately read or write enqueuing the referenced logical tracks and for managing segment space availability by destaging tracks to the buffer of the LSA according to a usage discipline, and means for reclaiming regions of segments of the LSA by a garbage collection procedure, said reclaimed regions being available for recording segments formed from write modified logical tracks thereon, a method comprising the steps of:

(a) accumulating neighborhoods of tracks in the buffer in a destage path from the cache means and in a garbage collection path from the LSA, and performing read-activity-based sorting of the accumulated neighborhoods of tracks into corresponding segments formed from write modified read active logical tracks, write modified read inactive logical tracks, clean read active logical tracks, and clean inactive logical tracks;

(b) writing segments from the buffer formed from write modified or clean read active tracks into an LSA DASD region of contiguous segments of read active tracks and writing segments from the buffer formed from write modified or clean read inactive tracks into an LSA DASD region of contiguous segments of read inactive tracks; and (c) ascertaining the number of free space segments in each region and garbage collecting segments having either free space, old write age, or read inactive tracks in the regions in the LSA where the detected number is less than a first threshold, continuing the collection until the number of collected segments exceeds a second threshold, and applying the collected segments to the garbage collection path.

2. In a system having a CPU and means for establishing directory controlled read and write access paths to logical tracks stored in a segment-oriented buffered log structured array (LSA) of DASDs via caching means coupling the buffered array, said caching means managing segment space availability by destaging one or more logical tracks according to a usage discipline (LRU) to the buffer, said caching means including means for reclaiming regions of segments of the LSA by a garbage collection procedure for recording write modified logical tracks thereon, said logical tracks including write modified and clean tracks, a method for preserving seek affinity on CPU initiated read and write access patterns to the LSA, comprising the reiterative steps of:

(a) ascertaining read activity of neighborhood accumulations of logical tracks;

(b) destaging logical tracks from the caching means according to the cache usage discipline and garbage collecting selected tracks from the LSA;

(c) sorting neighborhood accumulations of logical tracks obtained according to step (b) into counterpart buffers based on the ascertained read activity of the tracks exceeding or not exceeding a threshold;

(d) batch writing contents of the buffers to counterpart regions of segments on the DASD array such that the regions of segments formed from read active logical tracks are contiguous with each other and the regions of segments formed from read inactive logical tracks are contiguous with each other;

(e) ascertaining the number of free space segments in each region, free space segments being formed in a region as logical tracks stored in the segments of a region are modified or deleted over time; and (f) garbage collecting segments in regions having either free space, old write age, or read inactive tracks in the DASD array responsive to the ascertained number of free segments in any given region falling below a first threshold and continuing said garbage collection until the number of collected segments exceeds a second threshold.

3. The method according to claim 2, wherein the CPU initiated read and write access patterns are dominated by sequential read and random write access patterns, and further wherein in step (c) the ascertained read activity being the activity measured per step (a) at the time a logical track was destaged or collected per step (b).

4. The method according to claim 2, wherein each segment is partitionable into at least N data segment columns+ one parity segment column, said segment columns being counterpart to an array of N+1 DASDs, the method further comprises the steps of:

concurrently destaging all logically adjacent modified tracks from the caching means into the same segment-column of the buffer in the event that any other modified tracks are written to the cache and which constitute adjacent tracks to those already write enqueued, if said other tracks are written to cache prior to the first write enqueued track being destaged to said buffer from said caching means.

5. The method according to claim 4, wherein said method further comprises the steps of:

periodically ascertaining the fraction of the caching means occupied by write modified tracks; and responsive to the ascertained fraction exceeding a threshold, destaging any write modified track and other logically adjacent write modified tracks from the caching means into the same segment-column of the buffer.

6. The method according to claim 5, wherein the method further includes the step of:

concurrently destaging to the buffer from the caching means any clean logical tracks exceeding a predetermined number and which are logically adjacent the write modified tracks.

7. The method according to claim 2, wherein the method further comprises the steps of:

ascertaining, at a time prior to a predetermined space in said caching means occupied by a clean track is scheduled for reuse, whether at least a predetermined number m of logically adjacent clean tracks are stored in the caching means and not contiguously stored in the LSA of DASDs; and responsive to the presence of such tracks destaging the clean track and the m logically adjacent clean tracks from the caching means to the same memory segment-column in the buffer.

8. The method according to claim 2, wherein a neighborhood consists of an ordered set of logical tracks, a track is logically adjacent to another if they are both in the same neighborhood.

9. The method according to claim 2, wherein step (a) further includes the steps of:

initializing a read activity counter for each logical track stored in said caching means;

counting only those read accesses to a logical track not available in the read enqueued tracks in the caching means and noting access time of occurrence; and weighting the read accesses inversely according to their relative time of occurrence.

10. The method according to claim 9, wherein for a given group of N+1 DASDs, said DASDs being partitioned into regions of segments formed from read active data tracks and read inactive data tracks.

11. The method according to claim 10, wherein the region of segments formed from read active data tracks occupies the middle cylinders of the DASDs, and further wherein the region of segments formed from read inactive data tracks occupies the extremity cylinders of the DASDs.

12. The method according to claim 2, wherein the buffer includes a first, a second, a third and a fourth segment accumulating buffer, and further wherein the method comprises the steps of:

destaging write modified read active tracks from the cache into the first buffer, and write modified read inactive tracks from the cache into the second buffer;

destaging clean read active tracks from the cache and copying garbage collected read active tracks to the third buffer;

destaging clean read inactive tracks from the cache and copying garbage collected read inactive tracks to the fourth buffer; and writing the contents of the first and third buffers to regions formed from segments of read active tracks and writing the contents of the second and fourth buffers to regions formed from segments of read inactive tracks.

13. The method according to claim 12, wherein the LSA includes groups of N+1 DASDs, and further wherein the method comprises the steps of:

identifying the least busy group of N+1 DASDs, the least busy group of N+1 DABDs being that group whose busiest DASD is less busy than the busiest DABD of all the other groups of N+1 DABDs, busyness being proportional to the number of access requests queued against the DABD; and writing the contents of the first and third buffers on the identified least busy group into a region of segments formed from read active tracks and writing the contents of the second and fourth buffers on the identified least busy group into a region of segments formed from read inactive tracks.

14. The method according to claim 2, wherein each track is identified by a track number, the buffer includes counterpart buffers for write modified read active tracks, write modified read inactive tracks, clean read active tracks and clean read inactive tracks, and further wherein step (f) includes the steps of:

accumulating tracks in a dedicated buffer and writing the contents thereof into the segment buffers until the number of accumulated tracks is reasonably large;

sorting the tracks by track number and accumulating them into neighborhoods;

computing the average read activity per neighborhood; and writing the read active tracks into the buffer for clean read active tracks and writing read inactive tracks into the buffer for clean inactive tracks.

15. In a system having a CPU and means for establishing directory controlled read and write access paths to logical tracks stored in a segment oriented buffered log structured array (LSA) of DASDs via caching means coupling the buffered array, said caching means managing segment space availability by destaging one or more logical tracks according to a usage discipline (LRU) to the buffer, said caching means including means for reclaiming regions of segments of the LSA by a garbage collection procedure for recording write modified logical tracks thereon, said logical tracks including write modified and clean tracks, a method for preserving seek affinity on CPU initiated read and write access patterns to the LSA, comprising the reiterative steps of:

(a) ascertaining write age activity of neighborhood accumulations of logical tracks;

(b) destaging logical tracks from the cache according to the cache usage discipline and garbage collecting selected tracks from the LSA;

(c) sorting neighborhood accumulations of logical tracks obtained according to step (b) into separate counterpart buffers based on the ascertained write age activity of the tracks exceeding or not exceeding a threshold for the destaged tracks and otherwise for the garbage collected tracks;

(d) batch writing contents of the buffers to counterpart regions of segments on the DASD array such that the regions of segments formed from write active logical tracks are contiguous with each other and the regions of segments formed from write inactive logical tracks are contiguous with each other;

(e) ascertaining the number of free space segments in each region, free space segments being formed in a region as logical tracks stored in the segments of a region are modified or deleted over time; and (f) garbage collecting regions having free space segments, old write age segments, or read inactive tracks in the DASD array responsive to the ascertained number of free segments in any given region falling below a first threshold and continuing said garbage collection until the number of collected segments exceeds a second threshold.

16. The method according to claim 15, wherein regions formed from segments of recently written modified tracks exhibit a write age dominated by an age less than that of segments formed from garbage collected tracks.

17. The method according to any one of the claims 1, 2, or 15, wherein the logical tracks may be formatted to accept fixed block records or variable length records.

18. In a system having a segment-oriented and buffered log structured array (LSA) of DASDs, directory controlled means for establishing read and write access paths to logical tracks stored in said segments on said LSA as referenced by a source of external commands, cache means coupling the source and the LSA for separately read or write enqueuing the referenced logical tracks and for managing segment space availability by destaging tracks to the buffer of the LSA according to a usage discipline, and means for reclaiming regions of segments of the LSA by a garbage collection procedure, said reclaimed regions being available for recording segments formed from write modified logical tracks thereon, wherein the improvement comprises:

means for accumulating racks in the buffer in a destage path from the cache means and in a garbage collection path from the LSA, means for sorting the accumulated tracks into corresponding segments formed from write modified read active logical tracks, write modified read inactive logical tracks, clean read active logical tracks, and clean inactive logical tracks; means for writing segments from the buffer formed from write modified or clean read active tracks into an LSA region of contiguous segments of read active tracks and for writing segments form the buffer formed from write modified or clean read inactive tracks into an LSA region of contiguous segments of read inactive tracks; and means for detecting the number of free space segments in each region and garbage collecting segments having either free space ore read inactive tracks in the regions in the LSA as a function of a first threshold, for continuing the collection until the number of collected segments exceeds a second threshold, and for applying the collected segments to the garbage collection path.

19. In a system having a CPU and means for establishing directory controlled read and write access paths to logical tracks stored in a segment-oriented buffered log structured array (LSA) of DASDs via caching means coupling the buffered array, said caching means managing segment space availability by destaging one or more logical tracks according to a usage discipline (LRU) to the buffer, said caching means including means for reclaiming regions of segments of the LSA by a garbage collection procedure for recording write modified logical tracks thereon, said logical tracks including write modified and clean tracks, a method for preserving seek affinity on CPU initiated read and write access patterns to the LSA, comprising the reiterative steps of:

(a) ascertaining read activity of neighborhood accumulations of logical tracks;

(b) destaging logical tracks from the caching means according to the cache usage discipline and garbage collecting selected tracks from the LSA;

(c) sorting neighborhood accumulations of logical tracks obtained according to step (b) into counterpart buffers based on the ascertained read activity of the tracks exceeding or not exceeding a threshold;

(d) batch writing contents of the buffers to counterpart regions of segments on the DASD array such that the regions of segments formed from read active logical tracks are contiguous with each other and the regions of segments formed from read inactive logical tracks are contiguous with each other;

(e) ascertaining the number of free space segments in each region, free space segments being formed in a region as logical tracks stored in the segments of a region are modified or deleted over time; and (f) garbage collecting segments in regions having either free space, old write age, or read inactive tracks in the DASD array responsive to the ascertained number of free segments in any given region falling below a first threshold and continuing said garbage collection until the number of collected segments exceeds a second threshold; wherein each segment is partitionable into at least N data segment columns+one parity segment column, said segment columns being counterpart to an array of N+1 DASDs; and (g) concurrently destaging all logically adjacent modified tracks from the caching means into the same segment-column of the buffer in the event that any other modified tracks are written in the cache and which constitute adjacent tracks to those already write enqueued, if said other tracks are written to cache prior to the first write enqueued track being destaged to said buffer from said caching means.

20. The method according to claim 19, wherein said method further comprises the steps of:

periodically ascertaining the fraction of the caching means occupied by write modified tracks; and responsive to the ascertained fraction exceeding a threshold, destaging any write modified track and other logically adjacent write modified tracks from the caching means into the same segment-column of the buffer.

21. The method according to claim 20, wherein the method further includes the step of:

concurrently destaging to the buffer from the caching means any clean logical tracks exceeding a predetermined number and which are logically adjacent the write modified tracks.

22. In a system having a CPU and means for establishing directory controlled read and write access paths to logical tracks stored in a segment-oriented buffered log structured array (LSA) of DASDs via caching means coupling the buffered array, said caching means managing segment space availability by destaging one or more logical tracks according to a usage discipline (LRU) to the buffer, said caching means including means for reclaiming regions of segments of the LSA by a garbage collection procedure for recording write modified logical tracks thereon, said logical tracks including write modified and clean tracks, a method for preserving seek affinity on CPU initiated read and write access patterns to the LSA, comprising the reiterative steps of:

(a) ascertaining read activity of neighborhood accumulations of logical tracks;

(b) destaging logical tracks from the caching means according to the cache usage discipline and garbage collecting selected tracks from the LSA;

(c) sorting neighborhood accumulations of logical tracks obtained according to step (b) into counterpart buffers based on the ascertained read activity of the tracks exceeding or not exceeding a threshold;

(d) batch writing contents of the buffers to counterpart regions of segments on the DASD array such that the regions of segments formed from read active logical tracks are contiguous with each other and the regions of segments formed from read inactive logical tracks are contiguous with each other;

(e) ascertaining the number of free space segments in each region, free space segments being formed in a region as logical tracks stored in the segments of a region are modified or deleted over time;

(f) garbage collecting segments in regions having either free space, old write age, or read inactive tracks in the DASD array responsive to the ascertained number of free segments in any given region falling below a first threshold and continuing said garbage collection until the number of collected segments exceeds a second threshold;

(g) ascertaining, at a time prior to a predetermined space in said caching means occupied by a clean track is scheduled for reuse, whether at least a predetermined number m of logically adjacent clean tracks are stored in the caching means and not contiguously stored in the LSA of DASDs; and (h) responsive to the presence of such tracks destaging the clean track and the m logically adjacent clean tracks from the caching means to the same memory segment-column in the buffer.

23. In a system having a CPU and means for establishing directory controlled read and write access paths to logical tracks stored in a segment-oriented buffered log structured array (LSA) of DASDs via caching means coupling the buffered array, said caching means managing segment space availability by destaging one or more logical tracks according to a usage discipline (LRU) to the buffer, said caching means including means for reclaiming regions of segments of the LSA by a garbage collection procedure for recording write modified logical tracks thereon, said logical tracks including write modified and clean tracks, a method for preserving seek affinity on CPU initiated read and write access patterns to the LSA, comprising the reiterative steps of:

(a) ascertaining read activity of neighborhood accumulations of logical tracks;

(b) destaging logical tracks from the caching means according to the cache usage discipline and garbage collecting selected tracks from the LSA;

(c) sorting neighborhood accumulations of logical tracks obtained according to step (b) into counterpart buffers based on the ascertained read activity of the tracks exceeding or not exceeding a threshold;

(d) batch writing contents of the buffers to counterpart regions of segments on the DASD array such that the regions of segments formed from read active logical tracks are contiguous with each other and the regions of segments formed from read inactive logical tracks are contiguous with each other;

(e) ascertaining the number of free space segments in each region, free space segments being formed in a region as logical tracks stored in the segments of a region are modified or deleted over time; and (f) garbage collecting segments in regions having either free space, old write age, or read inactive tracks in the DASD array responsive to the ascertained number of free segments in any given region falling below a first threshold and continuing said garbage collection until the number of collected segments exceeds a second threshold;

wherein a neighborhood consists of an ordered set of logical tracks, a track is logically adjacent to another if they are both in the same neighborhood.

24. In a system having a CPU and means for establishing directory controlled read and write access paths to logical tracks stored in a segment-oriented buffered log structured array (LSA) of DASDs via caching means coupling the buffered array, said caching means managing segment space availability by destaging one or more logical tracks according to a usage discipline (LRU) to the buffer, said caching means including means for reclaiming regions of segments of the LSA by a garbage collection procedure for recording write modified logical tracks thereon, said logical tracks including write modified and clean tracks, a method for preserving seek affinity on CPU initiated read and write access patterns to the LSA, comprising the reiterative steps of:

(a) ascertaining read activity of neighborhood accumulations of logical tracks, initializing a read activity counter for each logical track stored in said caching means, counting only those read accesses to a logical track not available in the read enqueued tracks in the caching means and noting access time of occurrence, and weighting the read accesses inversely according to their relative time of occurrence;

(b) destaging logical tracks from the caching means according to the cache usage discipline and garbage collecting selected tracks from the LSA;

(c) sorting neighborhood accumulations of logical tracks obtained according to step (b) into counterpart buffers based on the ascertained read activity of the tracks exceeding or not exceeding a threshold;

(d) batch writing contents of the buffers to counterpart regions of segments on the DASD array such that the regions of segments formed from read active logical tracks are contiguous with each other and the regions of segments formed from read inactive logical tracks are contiguous with each other;

(e) ascertaining the number of free space segments in each region, free space segments being formed in a region as logical tracks stored in the segments of a region are modified or deleted over time; and (f) garbage collecting segments in regions having either free space, old write age, or read inactive tracks in the DASD array responsive to the ascertained number of free segments in any given region falling below a first threshold and continuing said garbage collection until the number of collected segments exceeds a second threshold; wherein for a given group of N+1 DASDs, said DASDs being partitioned into regions of segments formed from read active data tracks and read inactive data tracks.

25. The method according to claim 24, wherein the region of segments formed from read active data tracks occupies the middle cylinders of the DASDs, and further wherein the region of segments formed from read inactive data tracks occupies the extremity cylinders of the DASDs.

26. In a system having a CPU and means for establishing directory controlled read and write access paths to logical tracks stored in a segment-oriented buffered log structured array (LSA) of DASDs via caching means coupling the buffered array, said caching means managing segment space availability by destaging one or more logical tracks according to a usage discipline (LRU) to the buffer, said caching means including means for reclaiming regions of segments of the LSA by a garbage collection procedure for recording write modified logical tracks thereon, said logical tracks including write modified and clean tracks, said buffer including a first, a second, a third and a fourth segment accumulating buffer, a method for preserving seek affinity on CPU initiated read and write access patterns to the LSA, comprising the reiterative steps of:

(a) ascertaining read activity of neighborhood accumulations of logical tracks;

(b) destaging logical tracks from the caching means according to the cache usage discipline and garbage collecting selected tracks from the LSA;

(c) sorting neighborhood accumulations of logical tracks obtained according to step (b) into counterpart buffers based on the ascertained read activity of the tracks exceeding or not exceeding a threshold;

(d) batch writing contents of the buffers to counterpart regions of segments on the DASD array such that the regions of segments formed from read active logical tracks are contiguous with each other and the regions of segments formed from read inactive logical tracks are contiguous with each other;

(e) ascertaining the number of free space segments in each region, free space segments being formed in a region as logical tracks stored in the segments of a region are modified or deleted over time;

(f) garbage collecting segments in regions having either free space, old write age, or read inactive tracks in the DASD array responsive to the ascertained number of free segments in any given region falling below a first threshold and continuing said garbage collection until the number of collected segments exceeds a second threshold;

(g) destaging write modified read active tracks from the cache into the first buffer, and write modified read inactive tracks from the cache into the second buffer;

(h) destaging clean read active tracks from the cache and copying garbage collected read active tracks to the third buffer;

(i) destaging clean read inactive tracks from the cache and copying garbage collected read inactive tracks to the fourth buffer; and (j) writing the contents of the first and third buffers to regions formed from segments of read active tracks and writing the contents of the second and fourth buffers to regions formed from segments of read inactive tracks.

27. The method according to claim 26, wherein the LSA includes groups of N+1 DASDs, and further wherein the method comprises the steps of:

identifying the least busy group of N+1 DASDs, the least busy group of N+1 DASDs being that group whose busiest DASD is less busy than the busiest DASD of all the other groups of N+1 DASDs, busyness being proportional to the number of access requests queued against the DASD; and writing the contents of the first and third buffers on the identified least busy group into a region of segments formed from read active tracks and writing the contents of the second and fourth buffers on the identified least busy group into a region of segments formed from read inactive tracks.

28. In a system having a CPU and means for establishing directory controlled read and write access paths to logical tracks stored in a segment-oriented buffered log structured array (LSA) of DASDs via caching means coupling the buffered array, said caching means managing segment space availability by destaging one or more logical tracks according to a usage discipline (LRU) to the buffer, said caching means including means for reclaiming regions of segments of the LSA by a garbage collection procedure for recording write modified logical tracks thereon, said logical tracks including write modified and clean tracks, wherein each track is identified by a track number, the buffer includes counterpart buffers for write modified read active tracks, write modified read inactive tracks, clean read active tracks and clean read inactive tracks, a method for preserving seek affinity on CPU initiated read and write access patterns to the LSA, comprising the reiterative steps of:

(a) ascertaining read activity of neighborhood accumulations of logical tracks;

(b) destaging logical tracks from the caching means according to the cache usage discipline and garbage collecting selected tracks from the LSA;

(c) sorting neighborhood accumulations of logical tracks obtained according to step (b) into counterpart buffers based on the ascertained read activity of the tracks exceeding or not exceeding a threshold;

(d) batch writing contents of the butters to counterpart regions of segments on the DASD array such that the regions of segments formed from read active logical tracks are contiguous with each other and the regions of segments formed from read inactive logical tracks are contiguous with each other;

(e) ascertaining the number of free space segments in each region, free space segments being formed in a region as logical tracks stored in the segments of a region are modified or deleted over time; and (f) garbage collecting segments in regions having either free space, old write age, or read inactive tracks in the DASD array responsive to the ascertained number of free segments in any given region falling below a first threshold and continuing said garbage collection until the number of collected segments exceeds a second threshold, by performing steps comprising:

accumulating tracks in a dedicated buffer and writing the contents thereof into the segment buffers until the number of accumulated tracks is reasonably large;

sorting the tracks by track number and accumulating them into neighborhoods;

computing the average read activity per neighborhood; and writing the read active tracks into the buffer for clean read active tracks and writing read inactive tracks into the buffer for clean inactive tracks.

* * * * *